United States Patent
Pachmayr

[15] 3,672,084
[45] June 27, 1972

[54] REINFORCED PISTOL GRIP
[72] Inventor: Frank A. Pachmayr, Los Angeles, Calif.
[73] Assignee: Mershon Company, Los Angeles, Calif.
[22] Filed: June 8, 1970
[21] Appl. No.: 44,347

[52] U.S. Cl. ...................................................42/71 P
[51] Int. Cl. .......................................................F41c 23/00
[58] Field of Search...................................42/71 P, 71 R, 74

[56] References Cited

UNITED STATES PATENTS 1,531,796  3/1925  Loomis...................................42/71 P
1,951,135  3/1934  Emswiler..................................42/74

Primary Examiner—Benjamin A. Borchelt
Assistant Examiner—C. T. Jordan
Attorney—White, Haefliger and Bachand

[57] ABSTRACT

A pistol grip is formed by molding similar rubber sections of rubber internally reinforced by apertured metallic stampings having progressively increasing concavities toward the butt end of the grip and from flattened terminals at their opposite ends, the stampings being fully embedded in the rubber and conformed to the shape of the grip.

7 Claims, 9 Drawing Figures

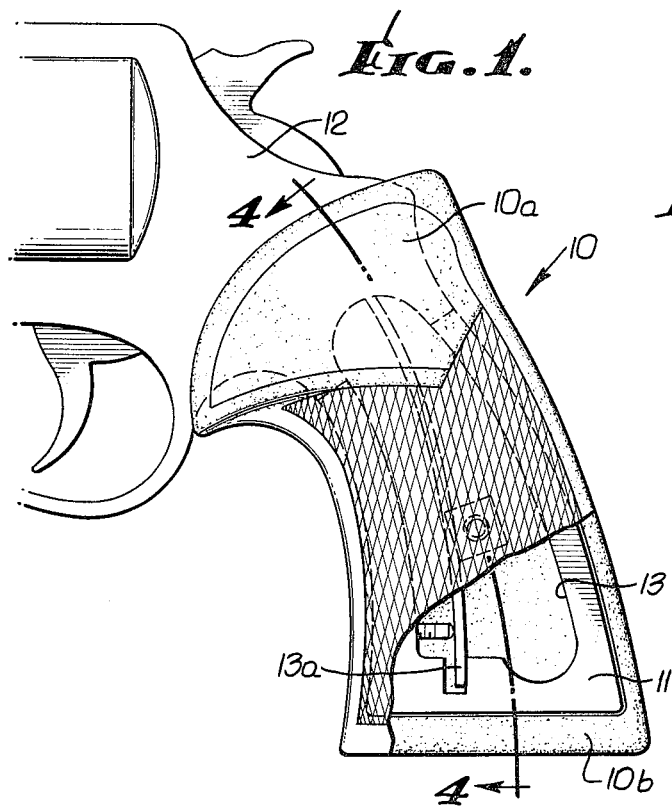
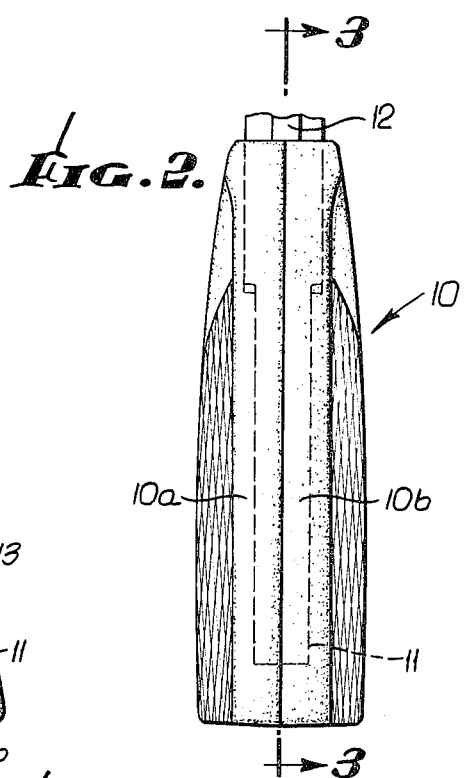
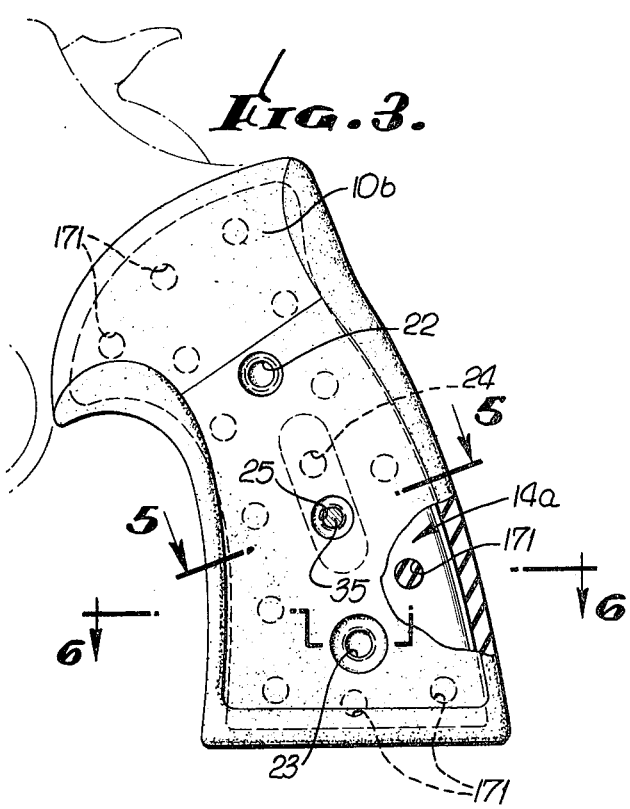
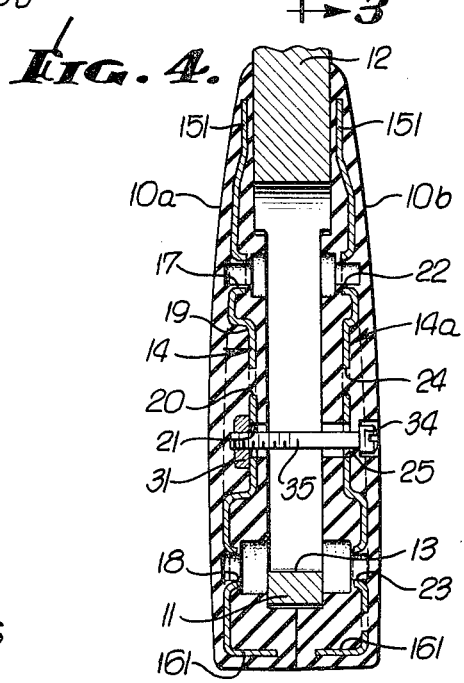
INVENTOR.
FRANK A. PACHMAYR
BY
White, Haefliger & Bachand
ATTORNEYS.

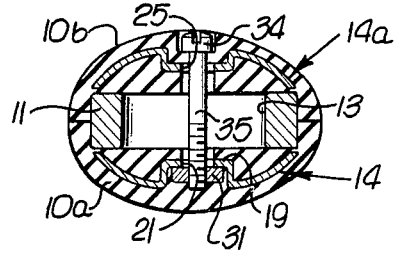
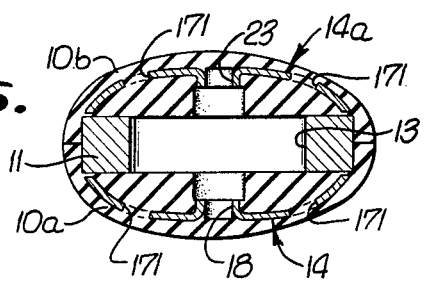
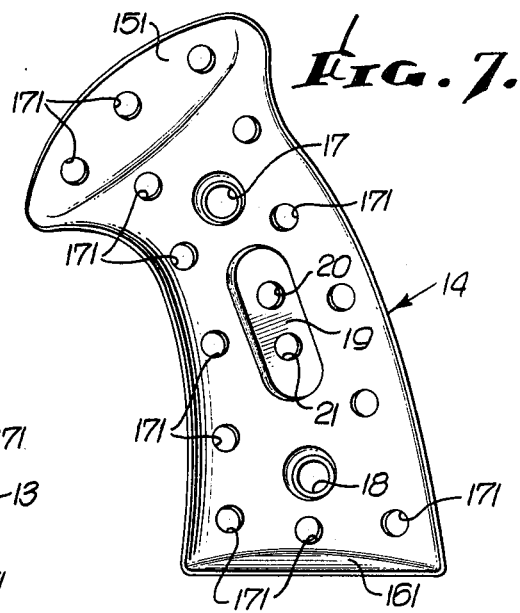
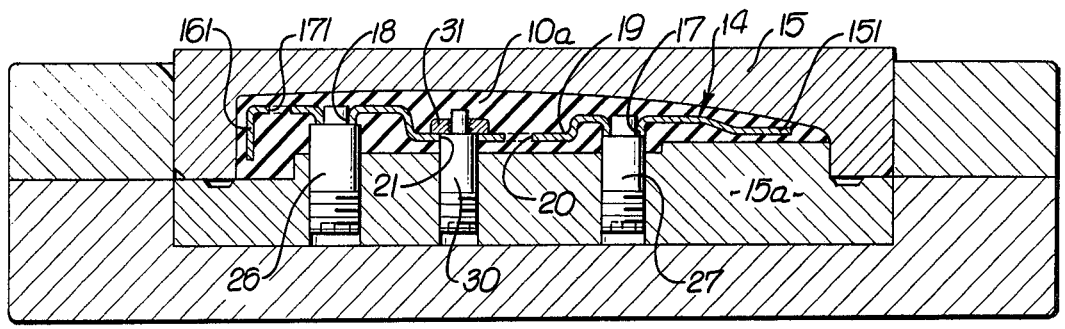
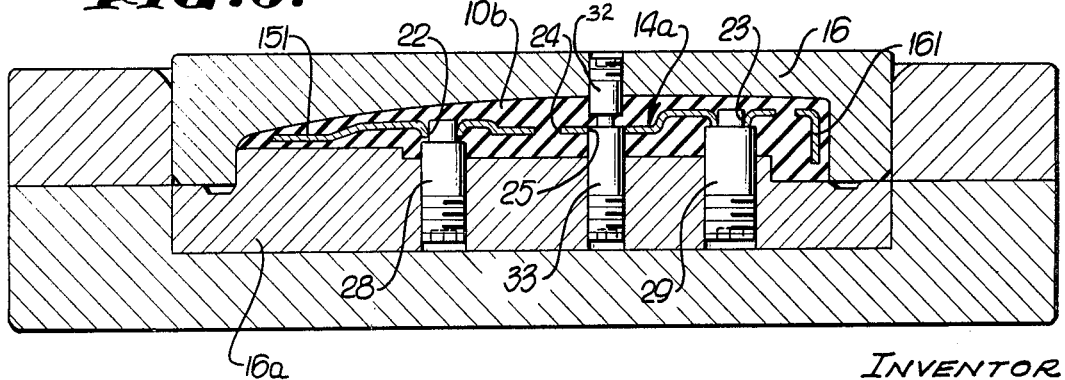

REINFORCED PISTOL GRIP

SUMMARY OF THE INVENTION

This invention relates to the internal reinforcement of molded rubber pistol grips formed of like sections containing embedded reinforcing metal stampings having shape and other characteristics that produce significant improvements in the grip.

My general object is to so support the grip rubber close to its surfaces as to permit the use of softer rubbers more comfortable to the hand of the user and contributing therefor to the ease and accuracy with which the gun may be used.

Such results are achieved by molding in the grip rubber close to its surfaces similar or identical metal stampings that correspond in shape to the contour of the grip and therefore are generally concave.

More particularly, the invention contemplates formation of the stampings with increasing concavity toward the butt end of the grip and from flattened extents of their opposite ends.

The stampings have other features such as particular and preferred locations and distributions of bonding apertures and means for interconnecting the grip sections, all of which will be most readily understood from the following detailed description of an illustrative embodiment of the invention as shown in the accompanying drawings.

BRIEF DESCRIPTION OF THE DRAWINGS

FIG. 1 is a side elevation showing an illustrative embodiment of the invention with one of the grip sections broken away to reveal the interior association with the shank extent of the pistol;

FIG. 2 is an elevation showing the grip as viewed from the right side of FIG. 1;

FIG. 3 is a view similar to FIG. 1 showing one of the grip sections and the configurations of the embedded metal reinforcement;

FIG. 4 is a section through the grip taken on line 4—4 of FIG. 1;

FIGS. 5 and 6 are cross sections respectively on lines 5—5 and 6—6 of FIG. 3;

FIG. 7 is a side elevation showing one of the reinforcement stampings;

FIG. 8 is a view taken in the curve plane 4—4 of FIG. 1 illustrative of molding of one of the grip sections; and FIG. 9 is a similar view illustrative of molding of the other grip section.

DESCRIPTION OF THE PREFERRED EMBODIMENTS

In reference first to FIGS. 1 to 3 the sectionally molded grip generally indicated at 10 is shown in its association with what may be referred to as the shank extent 11 of the pistol 12, the shank conforming generally to the shape of the grip and having an open central area 13 containing the conventional hammer spring 13a. The grip rubber is molded to a pair of fully embedded reinforcement stampings 14 and 14a, a side elevation of one of the stampings appearing in FIG. 7.

As the drawings illustrate, each of the stampings 14, 14a is contoured in shape correspondence with the grip and therefore has concavities increasing in depth progressively from an upper flattened area 151 toward the bottom of the grip and flange 161. Each stamping has rubber bonding apertures 171 distributed within the flattened area 151 as well as along the sides and bottom of the stamping.

It is desirable that in the molding operation the stampings 14 and 14a be embedded in the rubber sufficiently close to the grip surfaces as to provide support for rubber softer than conventional grip rubbers in order that, as previously indicated, it is made possible to use a rubber that is recoil absorptive and more comfortable in the hand of the user. To this end I employ a rubber molding technique shown in FIGS. 8 and 9 which illustrate respectively positioning of the grip sections 10a and 10b and stampings 14, 14a within and between the mold sections 15, 15a and 16, 16a.

As best illustrated in FIG. 4 stamping 14 is formed to present inwardly necked openings 17 and 18 between which the stamping is recessed at 19 to contain openings 20 and 21. Stamping 14a has inwardly necked apertures 22 and 23 between which the stamping is apertured at 24 and 25. The purpose of these necked aperture configurations is to enable the reinforcement stampings to be supported by pins 26, 27, 28 and 29 in the molding operation so as to bring and maintain the stampings accurately close to the outer surfaces of the rubber forming the grip sections 10 and 10a. The mold pin 30 serves to removably position nut 31 in the recess 19 and the mold pins 32 and 33 serve to provide for reception of screw head 34 and for the screw 35 which interconnects the sections by being threaded into the nut 31.

After being molded and presenting at their intersurface cavities corresponding to the locations of the pins 30 and 33 which remain in the mold, the grip sections are attachable to the pistol shank 11 by the insertion and turning of screw 34 into the embedded nut 30 as shown in FIG. 4. Selection as between openings 20 and 21 for reception and passage of the screw will depend upon particular gun models.

In contrast with conventional grips molded with rubbers having about 90 shore hardness, the invention contemplates the use of softer rubber, typically Neoprene of hardness in the 35 to 55 shore hardness range which despite its softness is stabilized by the reinforcement stampings to afford much better grip surfaces for the gun, even in extremely cold weather. Also the softer rubber is found to absorb about 75 percent of the recoil from heavy calibred cartridges.

I claim:

1. An internally reinforced pistol grip comprising a pair of similar molded rubber body sections interengaged in a central plane of the grip and adapted to receive between them a shank terminal of the pistol, said sections containing apertured metallic internally concave reinforcement stampings forming opposed recesses, the edges of the stampings corresponding with the shapes of said sections and being fully embedded in the sections, and means interconnecting the sections through openings in the stampings alinable with an opening in said shank terminal.

2. A grip according to claim 1 in which said stampings are formed to have progressively increasing concave depth toward the butt end of the grip and from flattened terminals within the opposite end of the grip.

3. A grip according to claim 2, in which said interconnecting means is a screw threadable into a nut embedded in one of said sections within a recess in the outer surfaces of one of the stampings.

4. A grip according to claim 2, in which said stampings have distributed rubber bonding apertures including openings along said flattened terminals.

5. A grip according to claim 4, in which the stampings also have bonding openings along and adjacent closed ends at the butt end of the grip.

6. A grip according to claim 5, in which the stampings each contains above and below said recesses a pair of internally necked openings for reception of supporting pins in molding the sections.

7. A grip according to claim 1, in which the sections are molded of rubber having about 35–55 shore hardness.

* * * * *